United States Patent [19]

Sliger

[11] 4,095,470
[45] Jun. 20, 1978

[54] THERMAL ELEMENT AND PARTS THEREFOR AND METHODS OF MAKING THE SAME

[75] Inventor: Boyd P. Sliger, Concord, Tenn.

[73] Assignee: Robertshaw Controls Company, Richmond, Va.

[21] Appl. No.: 808,874

[22] Filed: Jun. 22, 1977

[51] Int. Cl.² ............................................. G01K 5/00
[52] U.S. Cl. .................................. 73/368; 137/242; 236/34.5; 277/24; 277/DIG. 6
[58] Field of Search ............... 73/368, 347; 236/100, 236/34.5; 277/24, DIG. 6; 137/242; 251/268

[56] References Cited
U.S. PATENT DOCUMENTS 3,352,316  11/1967  Zahn ..................................... 137/242

*Primary Examiner*—Donald O. Woodiel
*Attorney, Agent, or Firm*—Candor, Candor & Tassone

[57] ABSTRACT

A thermal element having a cylinder member carrying a piston member that projects out of an opening of an end of the cylinder member to be extended and retracted relative thereto upon changes of sensed temperature. A washer-like resilient seal member is carried by the end of the cylinder member and has an opening therethrough that press-fittingly receives the piston member therethrough in such a manner that an inner peripheral portion of the washer-like seal member is turned into substantially parallel sealing and wiping engagement with the stem while being substantially transverse to the remainder of the washer-like seal member, the washer-like seal member containing abrasive material therein to provide a scraping action of the inner peripheral portion thereof against the piston member to clean the same as the piston member is moved relative thereto.

20 Claims, 4 Drawing Figures

THERMAL ELEMENT AND PARTS THEREFOR AND METHODS OF MAKING THE SAME

This invention relates to an improved thermal element and to parts therefor as well as to methods for making such a thermal element and methods for making such parts therefor and the like.

It is well known that thermal elements of the piston and cylinder type have been provided wherein each has a cylinder member carrying a piston member which projects out of an opening of an end of a cylinder member to be extended and retracted relative thereto upon changes of sensed temperature, such thermal element having many uses one of which is to operate a valving structure for an automobile radiator cooling system such as is set forth in the U.S. Pat. to Sliger, No. 3,973,729.

It was found according to the teachings of this invention that such prior known thermal elements each relied upon the close tolerance between the opening in the end of the cylinder member and the piston member movable therethrough to provide a seal to prevent material from entering into the cylinder member through the piston opening thereof.

However, it has been found that with the increasing higher operating temperatures of the vehicle coolants now being utilized and with the addition of new additives in the coolants to render the same free from freezing, the thermal cycle life of these prior known thermal elements has been progressively decreasing due to the tendency of certain of the compounds of the coolant to adhere to the extended piston members of the thermal elements and be carried down into the cylinder members thereof when the piston members are subsequently retracted into the cylinder members. For example, if these compounds are liquid, they can be trapped inside and around the rubber parts of the cylinder members and cause a shift in the temperature movement characteristic of the thermal elements. If the compounds adhering to the piston members are in the solid state, they tend to fill the annular clearances provided between the piston members and the cylinder members to the extent that the piston members will not readily retract into the cylinder members when the thermal elements are subsequently cooled.

Accordingly, it is a feature of this invention to provide an improved seal means for such thermal elements to tend to eliminate the above described problems.

In particular, it was found according to the teachings of this invention, that a seal means can be provided at the end of the cylinder member through which the piston member extends.

For example, one embodiment of this invention provides a thermal element having a cylinder member carrying a piston member which projects out of an opening of an end of a cylinder member to be extended and retracted relative thereto upon changes of sensed temperature. A washer-like resilient seal member is carried by the end of the cylinder member and has an opening therethrough and press-fittingly receives the piston member therethrough in such a manner that an inner peripheral portion of the washer-like seal member is turned into substantially parallel sealing and wiping engagement with the piston member while being substantially transverse to the remainder of the washer-like seal member, the washer-like seal mamber containing abrasive means therein to provide a scraping action of the inner peripheral portion thereof against the piston member to clean the same as the piston member is moved relative thereto.

A similar seal member has the inner peripheral portion thereof formed in substantially the same manner around a plunger member being moved relative thereto and is described and claimed in the copending patent application of William T. Moon, Jr., Ser. No. 804,598, filed June 8, 1977.

However, the washer-like seal member of that copending patent application is filled with graphite material to facilitate movement of the plunger relative thereto whereas, in contrast, the resilient washer-like seal member of this invention is filled with an abrasive means to provide a scraping action of the inner peripheral portion of the seal member against the movable piston member to clean the same to tend to eliminate and prevent the solid compounds of the coolant material that adhere to the piston member from entering into the cylinder member of the thermal element of this invention.

Accordingly, it is an object of this invention to provide an improved thermal element having one or more of the novel features of this invention as set forth above or hereinafter shown or described.

Another object of this invention is to provide a method of making such a thermal element, the method of this invention having one or more of the novel features of this invention as set forth above or hereinafter shown or described.

Another object of this invention is to provide an improved seal assembly having one or more of the novel features of this invention as set forth above or hereinafter shown or described.

Another object of this invention is to provide a method of making such a seal assembly, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

FIG. 1 is a cross-sectional view illustrating a prior art thermal element being utilized to control a valve means of a vehicle radiator cooling system or the like.

Figure 1:
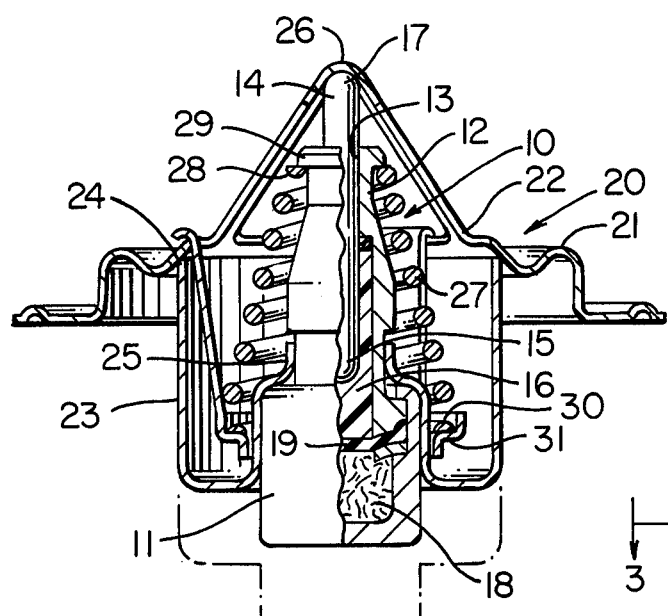

While the various features of this invention are hereinafter described and illustrated as being particularly adapted to provide a thermal element for controlling the valve means for a vehicle radiator cooling system, it is to be understood that the various features of this invention can be utilized singly or in any combination thereof to provide a seal means for other types of movable plungers as desired.

Therefore, this invention is not to be limited to only the embodiment illustrated in the drawings, because the drawings are merely utilized to illustrate one of the wide variety of uses of this invention.

Referring now to FIG. 1, a prior known thermal element is generally indicated by the reference numeral 10 and comprises a cylinder member 11 having a guide end 12 provided with an opening 13 passing therethrough and receiving a piston member 14 that has one end 15 disposed within a rubber insert 16 located inside the cylinder member 11 while the other end 17 of the piston member 14 extends out of the opening 13 as illustrated.

A wax charge or the like 18 is disposed in the cylinder member 11 and through a flexible diaphragm 19 is adapted to act against the resilient material 16 and, thus, on the end 15 of the piston member 14 to force the piston member 14 to extend further out of the opening 13 when the material 18 senses a certain temperature and thereby expands. Conversely, upon the temperature being sensed by the material 18 decreasing, the material 18 contracts and thereby permits the piston member 14 to be retracted back into the cylinder member 11 under a spring force in a manner hereinafter described and well known in the art.

One typical application of such a prior art thermal element 10 is illustrated in FIG. 1 and comprises a valve structure that is generally indicated by the reference numeral 20 and is utilizable in a vehicle radiator cooling system in such a manner that a valve seat member 21 of the valve structure 20 is adapted to span a flow passage of the cooling system and permit fluid flow through openings 22 thereof when a cup-shaped valve member 23 has its end 24 moved away from the closed condition illustrated in full lines in FIG. 1 to the open position illustrated in dash-dotted lines of FIG. 1 as is well known in the art.

In particular, the cup-shaped valve member 23 has its inner peripheral portion 25 fastened to the cylinder member 11 of the thermal element 10 while the end 17 of the piston member 14 engages against a central section 26 of the valve seat member 21. A compression spring 27 has one end 28 bearing against an annular shoulder 29 of the end 12 of the cylinder member 11 while the other end 30 thereof bears against a bracket 31 carried by the valve seat member 21 so that the force of the compression spring 27 tends to urge the cylinder member 11 upwardly in FIG. 1 relative to the stationary piston member 14 and, thus, in effect, retract the piston member 14 into the cylinder member 11 in a direction to tend to close the valve member 23 against the valve seat member 21 as illustrated in FIG. 1.

However, upon an increase in the temperature sensed by the thermal element 10, the charge 18 thereof expands and forces the cylinder member 11 downwardly relative to the stationary piston member 14 in opposition to the force of the compression spring 27 to thereby open the valve member 23 away from the valve seat means 21 to permit the radiator coolant material to flow through the now opened opening means 22 for a purpose well known in the art.

However, as previously stated, it was found that with such a prior known thermal element 10, the coolant fluid for the vehicle coolant system tended to deposit certain additive compounds onto the extended piston member 14 which if the same were liquid, they were able to be forced down between the piston member 14 and the end 12 of the cylinder 11 through the opening means 13 during a subsequent retraction of the piston member 14 into the cylinder member 11 to contaminate the rubber part 16 and thereby cause a shift in the temperature-movement characteristic of the thermal element 10. Also, some of the compounds adhering to the external piston member 14 are in the solid state and they tend to fill the annular clearance in the opening 13 between the piston member 14 and the end 12 of the cylinder member 11 to such an extent that the piston member 14 would not retract into the cylinder member 11 under the force of the compression spring 27 when the thermal element 10 cooled.

Therefore, this invention provides a seal means for the end 12 of the cylinder member 11 to seal the piston member 14 to tend to eliminate the aforementioned problems.

Figure 4:
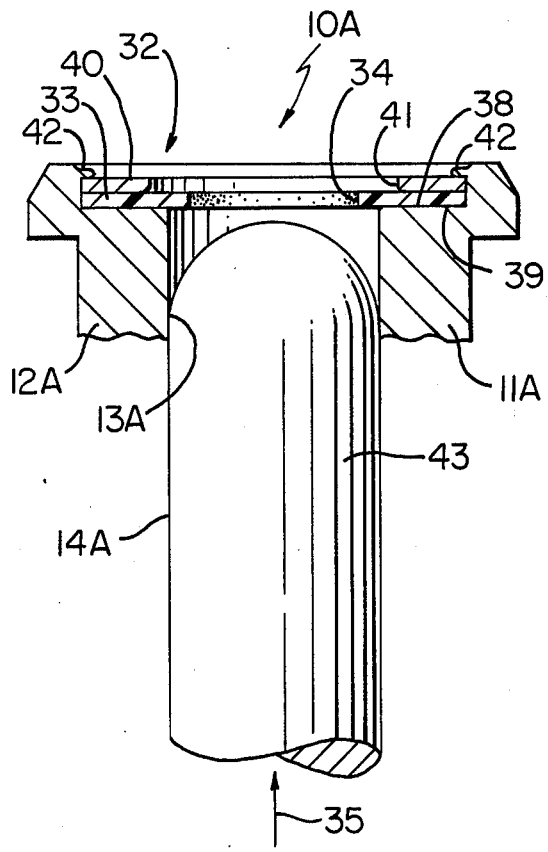
FIG. 4 is a view similar to FIG. 2 and illustrates one step in the method of this invention for making the thermal element of FIG. 2.
Figure 2:
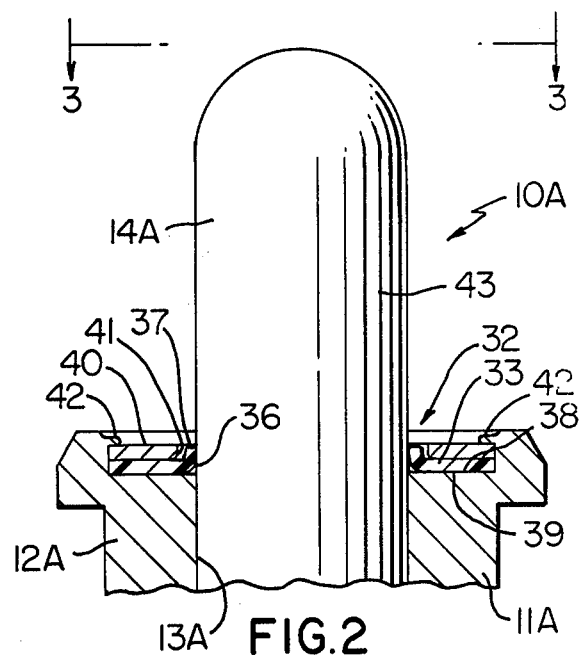
FIG. 2 is a an enlarged fragmentary cross-sectional view illustrating the improved thermal element of this invention.
Figure 3:
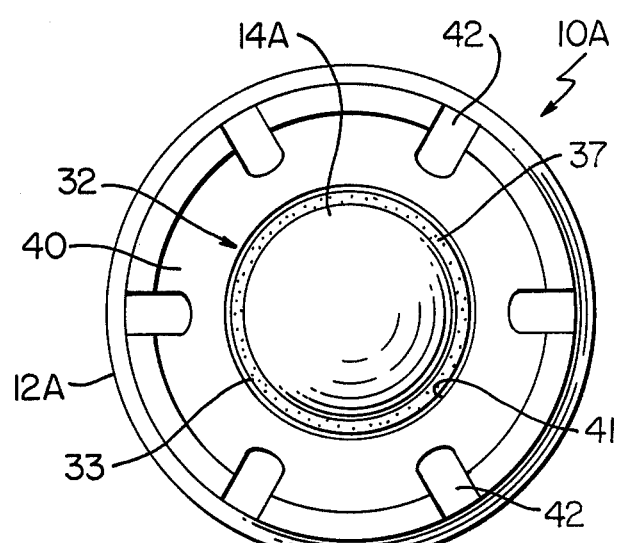
FIG. 3 is a top view of the thermal element of this invention and is taken in the direction of the arrows 3—3 of FIG. 2.

In particular, the thermal element of this invention is generally indicated by the reference numeral 10A in FIGS. 2–4 and parts thereof similar to the thermal element 10 previously described are indicated by like reference numerals followed by the reference letter "A".

As illustrated in FIG. 2, the thermal element 10A is substantially identical to the thermal element 10 previously described except that a seal means of this invention that is generally indicated by the reference numeral 32 is provided at the end 12A of the cylinder member 11A to cooperate with the piston member 14A to seal the exterior of the thermal element 10A from the opening 13A formed in the end 12A of the cylinder member 11A.

In particular, the seal means 32 of this invention comprises a resilient washer-like seal member 33 that initially has a central opening 34 passing therethrough in the manner illustrated in FIG. 4 of a size smaller than the outside diameter of the piston member 14A so that when the piston member 14A is initially inserted upwardly through the washer-like seal member 33 in the direction indicated by the arrow 35 in FIG. 4, the piston member 14A is press-fittingly forced through the opening 34 of the seal like member 33 to form the inner peripheral portion 36 thereof into a lip 37 that is turned substantially parallel to the longitudinal axis of the piston member 14A and is disposed in sealing and wiping engagement therewith while being substantially transverse to the remainder of the washer-like seal member 33 as illustrated in FIG. 2.

In order to hold and secure the washer-like seal member 33 to the end 12A of the cylinder member 11A, an annular recess 38 is formed in the end 12A of the cylinder member 11A to receive not only the washer-like seal member 33 against the annular shoulder 39 thereof, but also to receive a ring-like metallic retainer 40 that is disosed on top of the seal member 33 with the ring-like retainer member 40 having a central opening 41 passing therethrough of a diameter substantially larger than not only the initial diameter of the opening 34 of the seal member 33, but also larger than the diameter of the opening 13A in the end 12A of the cylinder member 11A as illustrated. The end 12A of the cylinder member 11A is subsequently staked over the retainer ring 40 in a plurality of places as indicated by the reference numerals 42 in FIGS. 2–4 to hold the retainer ring 40 and seal member 33 fully against the shoulder 39 of the end 12A of the cylinder member 11A before the piston member 14A is press-fitted through the opening 34 of the seal member 33 as illustrated in FIG. 4.

It has been found according to the teachings of this invention that the seal member 33 of the seal means 32 of this invention should be filled with abrasive material so that the inner peripheral portion 36 of the seal member 33 will provide a scraping action against the outer peripheral surface 43 of the piston member 14A to clean away any of the compounds that adhere thereon as the piston member 14A is retracted into the cylinder member 11A, such scraped away compounds falling away from the piston member 14A before that section of the piston member 14A is retracted into the opening 13A of the cylinder member 11A.

Thus, it can be seen that by controlling the amount and type of abrasive material in the seal member 33, the abrasive quality of the lip 37 of the seal member 33 can be adjusted and can be formulated to exhibit a desired cleaning or scraping action to clean the solid contaminates from the piston member 14A each time the piston member 14A retracts into the cylinder member 14A and thereby tend to prevent the contaminates from entering the opening 13A of the thermal element 10A.

For example, in one tested embodiment of the thermal element 10A of this invention, it was found that the seal member 33 can have a thickness of approximately 0.012 of an inch and can initially have an inside diameter of the opening 34 thereof of approximately 0.085 of an inch while the outside diameter of the piston member 14A is approximately 0.125 of an inch. Such a seal member 33 can be a fiberglass filled polytetrafluoroethylene (TEFLON-TFE) material sold under the tradename RULON-J by the Dixon Corporation of Bristol, R.I. whereby the fiberglass filling material thereof provides the desired abrasive qualities previously described. Of course, other abrasive materials can be utilized, if desired.

Therefore, it can be seen that the thermal element 10A of this invention can be formed in a relatively simple and effective manner by the method of this invention as illustrated in FIG. 4 and as previously described to operate in a manner now to be described.

As illustrated in FIG. 2, assume that the piston member 14A has been extended out of the end 12A of the cylinder member 11A during a heating cycle of the thermal element 10A so that the surface 43 of the piston member 14A is exposed to coolant material that adds solid and/or liquid particles thereon. The lip 37 of the seal member 33, by being urged against the peripheral surface 43 of the piston member 14A not only by the natural bias of the seal member 33, but also by any pressure external to the thermal element 10A, prevents such liquid particles on the surface 43 of the piston member 14A from seeping into the clearance between the cylinder member 11A and the piston member 14A at the opening 13A thereof as the lip 37 tends to flatten circumferentially against the piston member 14A.

Subsequently, as the piston 14A is retracted into the cylinder member 11A during a cooling cycle of the thermal element 10A, any solid contaminate particles on the surface 43 of the piston 14A which would normally be drawn into the opening 13A of the cylinder member 11A as in the case of the thermal element 10 previously described are scraped off of the surface 43 of the piston member 14A by the lip 37 through the abrasive characteristics thereof so that such solid contaminate particles cannot be drawn into the opening 13A of the cylinder 11A to tend to retard movement of the piston member 14A relative to the cylinder member 11A as is found with the prior known thermal element 10 previously described.

Therefore, it can be seen that this invention not only provides an improved thermal element and method of making the same, but also this invention provides an improved seal assembly for a plunger means as well as a method of making such a seal assembly or the like.

While the form and method of this invention, now preferred, have been illustrated and described as required by the Patent Statute, it is to be understood that other forms and method steps can be utilized and still fall within the scope of the appended claims.

What is claimed is:

1. In a thermal element having a cylinder member carrying a piston member that projects out of an opening of an end of said cylinder member to be extended and retracted relative thereto upon changes of sensed temperature, the improvement comprising a washer-like resilient seal member carried by said end of said cylinder member and having an opening therethrough and press-fittingly receiving said piston member therethrough in such a manner that an inner peripheral portion of said washer-like member is turned into substantially parallel sealing and wiping engagement with said piston member while being substantially transverse to the remainder of said washer-like member, said washer-like member containing abrasive means therein to provide a scraping action of said inner peripheral portion thereof against said piston member to clean the same as said piston member is moved relative thereto.

2. A thermal element as set forth in claim 1 wherein said turned inner peripheral portion of said washer-like seal member comprises an annular lip that extends along said piston member beyond the remainder of said washer-like seal member.

3. A thermal element as set forth in claim 2 wherein said lip of said washer-like seal member is directed toward the exterior of said end of said cylinder member so as to be exposed to fluid pressure external to said thermal element whereby such external pressure is adapted to act against said lip to urge said lip against said piston member.

4. A thermal element as set forth in claim 1 wherein said washer-like seal member comprises a fiber-glass filled polytetrafluoroethylene material.

5. A thermal element as set forth in claim 4 wherein said washer-like seal member initially had an inside diameter that was approximately 0.085 of an inch, the outside diameter of said piston member being approximately 0.125 of an inch.

6. In an assembly of a seal means and a plunger movable relative to said seal means with said seal means comprising a washer-like resilient seal member having an opening therethrough and press-fittingly receiving said plunger therethrough in such a manner that an inner peripheral portion of said washer-like member is turned into substantially parallel sealing and wiping engagement with said plunger while being substantially transverse to the remainder of said washer-like member, the improvement wherein said washer-like member contains abrasive means therein to provide a scraping action of said inner peripheral portion thereof against said plunger to clean the same as said plunger is moved relative thereto.

7. An assembly as set forth in claim 6 wherein said turned inner peripheral portion of said washer-like seal member comprises an annular lip that extends along said plunger beyond the remainder of said washer-like seal member.

8. An assembly as set forth in claim 7 wherein said lip of said washer-like seal member is directed toward the exterior of said assembly so as to be exposed to fluid pressure external to said assembly whereby such external pressure is adapted to act against said lip to urge said lip against said plunger.

9. An assembly as set forth in claim 6 wherein said washer-like member comprises a fiberglass filled polytetrafluoroethylene material.

10. An assembly as set forth in claim 9 wherein said washer-like seal member initially had an inside diameter that was approximately 0.085 of an inch, the outside diameter of said plunger being approximately 0.125 of an inch.

11. In a method of making a thermal element having a cylinder member carrying a piston member that projects out of an opening of an end of said cylinder member to be extended and retracted relative thereto upon changes of sensed temperature, the improvement comprising the steps of forming a washer-like resilient seal member to be carried by said end of said cylinder member and have an opening therethrough, press-fitting said piston member through said opening in such a manner that an inner peripheral portion of said washer-like member is turned into substantially parallel sealing and wiping engagement with said piston member while being substantially transverse to the remainder of said washer-like member, and forming said washer-like member to contain abrasive means therein so as to provide a scraping action of said inner peripheral portion thereof against said piston member to clean the same as said piston member is moved relative thereto.

12. A method of making a thermal element as set forth in claim 11 and including the step of forming said turned inner peripheral portion of said washer-like seal to comprise an annular lip that extends along said piston member beyond the remainder of said washer-like seal member.

13. A method of making a thermal element as set forth in claim 12 wherein said step of forming lip of said washer-like seal member forms said lip so as to be directed toward the exterior of said end of said cylinder member so as to be exposed to fluid pressure external to said thermal element whereby such external pressure is adapted to act against said lip to urge said lip against said piston member.

14. A method of making a thermal element as set forth in claim 11 and including the step of forming said washer-like seal member to comprise a fiberglass filled polytetrafluoroethylene material.

15. A method of making a thermal element as set forth in claim 14 and including the steps of forming said washer-like seal member to initially have an inside diameter that is approximately 0.085 of an inch, and forming the outside diameter of said piston member to be approximately 0.125 of an inch.

16. In a method of making an assembly of a seal means and a plunger movable relative to said seal means with said seal means comprising a washer-like resilient seal member having an opening therethrough and press-fittingly receiving said plunger therethrough in such a manner that an inner peripheral portion of said washer-like member is turned into substantially parallel sealing and wiping engagement with said plunger while being substantially transverse to the remainder of said washer-like member, the improvement comprising the step of forming said washer-like member to contain abrasive means therein to provide a scraping action of said inner peripheral portion thereof against said plunger to clean the same as said plunger is moved relative thereto.

17. A method of making an assembly as set forth in claim 16 and including the step of forming said turned inner peripheral portion of said washer-like seal to comprise an annular lip that extends along said plunger beyond the remainder of said washer-like seal member.

18. A method of making an assembly as set forth in claim 17 wherein said step of forming lip of said washer-like seal member forms said lip so as to be directed toward the exterior of said assembly so as to be exposed to fluid pressure external to said assembly whereby such external pressure is adapted to act against said lip to urge said lip against said plunger.

19. A method of making as assembly as set forth in claim 16 and including the step of forming said washer-like seal member to comprise a fiberglass filled polytetrafluoroethylene material.

20. A method of making as assembly as set forth in claim 19 and including the steps of forming said washer-like seal member to initially have an inside diameter that is approximately 0.085 of an inch, and forming the outside diameter of said plunger to be approximately 0.125 of an inch.

* * * * *